J. W. Mulley.
Mower

No 859

Reissued Nov. 29 1859

UNITED STATES PATENT OFFICE.

JEREMIAH W. MULLEY, OF AMSTERDAM, NEW YORK.

IMPROVEMENT IN REAPING AND MOWING MACHINES.

Specification forming part of Letters Patent No. 16,599, dated February 10, 1857; Reissue No. 859, dated November 29, 1859.

DIVISION A.

*To all whom it may concern:*

Be it known that I, JEREMIAH W. MULLEY, of Amsterdam, in the county of Montgomery and State of New York, have invented a new and useful Improvement in Mowing and Reaping Machines; and I hereby declare the following to be a full and clear description thereof, reference being had to the accompanying drawings, which form part of this specification, and in which—

Figure 1:
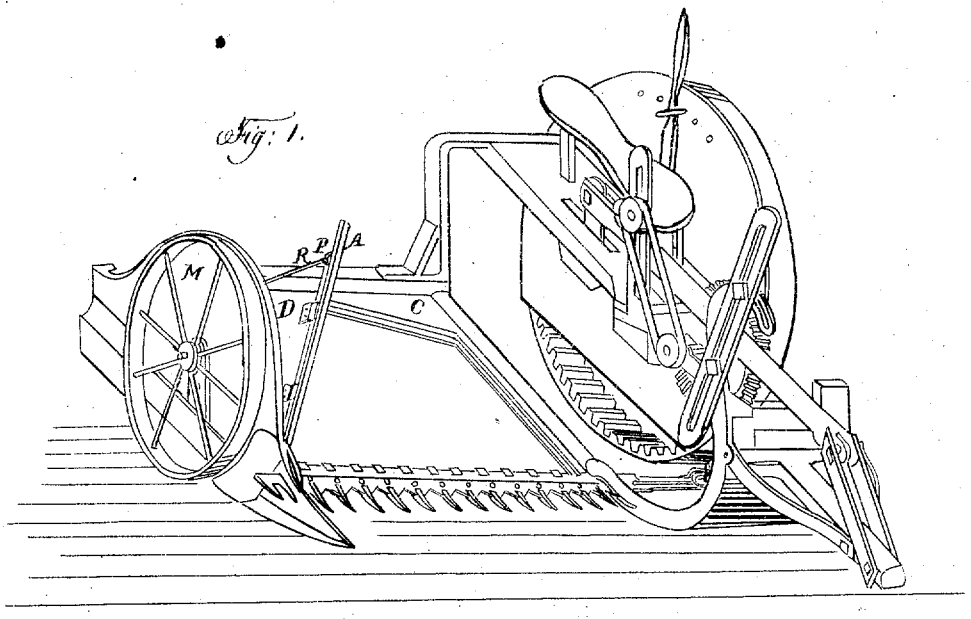
Figure 2:
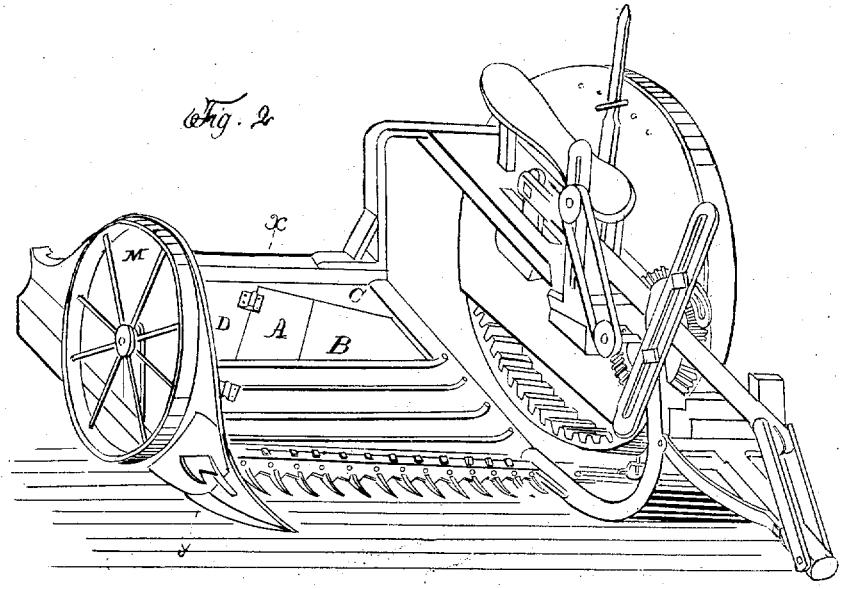

Figure 1 represents a view in perspective of a machine in part constructed according to my improvement as applied to mowing, and Fig. 2 a like view of the same when the machine is designed for reaping.

My present improvement having reference to the platform of the machine, I shall not describe here generally or in particular other parts.

The object of my invention is so to construct the platform of the machine as that while it shall afford the facility requisite for receiving the cut grain in reaping it shall readily permit of the discharge of said grain by the raker on the draft side of the machine, so as to keep the track clear for the machine in its succeeding traverse, and so that said platform or part of it may be turned or folded up to constitute a track-clearer to the machine, when the same is used for mowing, substantially as hereinafter described.

In the machine represented in the accompanying drawing the platform, which may be of square or quadrangular form, is so constructed and arranged as to receive the cut grain upon it freely as it falls from the cutter, or is urged by the reel in such lines or courses, as well at its off as at its near side, and so terminates at its side adjacent to the draft as that the raker may, when sufficient grain is gathered on the platform to form a sheaf, throw the grain off from the platform at its side between its draft-edge and the driving-wheel of the machine, away out of the track in the succeeding traverse of the machine. Such a character of platform constructed and arranged to facilitate delivery of the grain, as described, suggests the necessity, when the machine is to be converted into a mower and the platform removed, of the special addition to it of a track-clearer on the side of the machine farthest from the draft, and the function of which is to turn and throw the cut grass, as it falls, away from said side and more or less athwart the traverse. Such track-clearer would be objectionable as a fixture, as in using the machine as a reaper and discharging the cut grain, as described, it would be in the way and turn the grain in directions contrary to the required delivery, and in numerous cases in which the discharge of the cut grain is not as described it only operates as an incumbrance when the machine is used for reaping; but it is a great object in all combined mowers and reapers that as few additional pieces as possible should be introduced to convert a mower into a reaper, and vice versa, and that there should be as little special fitting of parts as practicable. Economy, time, labor, and liability to derangement make these considerations of great importance in such machines. I therefore construct the platform in part, and so that one or more or all of the parts thereof may be folded up or adjusted to make said platform serve the purpose of a track-clearer when it is desired to convert the machine into a mower. Thus the platform may be made in four parts, A, B, C, and D, the one part, A, of which should be movable upon a fixed line, $xy$, either by hinges or in any other suitable manner, so that when turned up, as represented in Fig. 1, it will lie in the required direction and perform the office, before described, of a track-clearer in mowing. This part A may be in form a trapezium, wherein the largest base is the axis of rotation. The guard-board M of the machine should be provided with a hook, R, which, engaging into an eye, P, will keep the part A in its required position to operate as a track-clearer for mowing when the central part, B, of the machine is removed. The other parts, C and D, of the platform may be permanent without much or any hinderance. Of course there is no absolute necessity for restricting the construction of the platform to any precise number, shape, or arrangement of parts, so long as it or part of it may be made to occupy at pleasure the position in relation to the cutter necessary to make it form a track-clearer or platform, or platform in part, accordingly as the machine is required for mowing or reaping, and whereby the one device is made to perform two functions. Said platform may be so constructed as to allow of its being folded up as a whole to form a track-clearer, so that no part of it, when adjusting the machine for mowing, need to be removed, and consequently no part exposed to get lost or be mislaid.

When the platform is laid down for reaping it may or may not be covered with a thin metallic plate, grooved in the direction of the passage of the rake to facilitate the operation of raking.

Having thus described my improvement in mowing and reaping machines, what I claim as my invention, and desire to secure by Letters Patent, is—

So constructing and arranging the platform of a reaper as that it or a portion may be made to form a track-clearer, when it is desired to convert the machine into a mower, substantially as herein specified.

In testimony whereof I have signed my name to this specification before two subscribing witnesses.

J. W. MULLEY.

Witnesses:
A. V. MORRIS,
HARRY BELL.